United States Patent [19]

Yamamoto et al.

[11] Patent Number: 4,980,109

[45] Date of Patent: Dec. 25, 1990

[54] METHODS OF MAKING COMPOSITE INJECTION MOLDED ARTICLES

[75] Inventors: Seiji Yamamoto; Kiichiro Fukui, both of Shizuoka, Japan

[73] Assignee: Polyplastics Co., Ltd., Osaka, Japan

[21] Appl. No.: 345,301

[22] Filed: May 1, 1989

[30] Foreign Application Priority Data

May 25, 1988 [JP] Japan ................................ 63-127539

[51] Int. Cl.⁵ ........................ B29C 45/14; B29C 71/02
[52] U.S. Cl. .................................... 264/135; 264/234; 264/265; 264/275; 264/279; 427/301; 427/302
[58] Field of Search ............... 264/135, 265, 234, 275, 264/279; 427/301, 302

[56] References Cited

U.S. PATENT DOCUMENTS

4,387,215  7/1983  Bailey .................................. 528/271
4,780,340  10/1988  Takahashi et al. ..................... 524/37

Primary Examiner—James Lowe
Attorney, Agent, or Firm—Nixon & Vanderhye

[57] ABSTRACT

An insert injection molding method is characterized by using an insert member having an applied surface coating comprised of an organic polymer compound, and at least one compounds selected from the group consisting of spiro ortho ester compound, spiro orthocarbonate compounds, trioxacylooctane compounds, and ketal lactone compounds.

18 Claims, 1 Drawing Sheet

METHODS OF MAKING COMPOSITE INJECTION MOLDED ARTICLES

FIELD OF INVENTION

The present invention relates to an improved insert injection molding method for preparing an insert molded article and to the resulting insert molded article. The article exhibits excellent airtightness, adhesion and adhesive properties between the insert member and the surrounding mass of injection molded thermoplastic.

BACKGROUND AND SUMMARY OF THE INVENTION

Insert injection molding is a molding method wherein an insert member having a preformed and predetermined shape is positioned within a mold. A thermoplastic resin is then injected into the mold to form a composite molded article comprised of the insert member and the mass of injection molded thermoplastic resin. Such a method has been conventionally employed as a means to form composite injection molded article whereby the insert member is mainly made of metal or resin.

In general, however, conventional composite articles thus prepared are not always satisfactory with respect to the airtightness, adhesion and adhesive properties at the boundary between the insert member and the surrounding resin mass. Therefore, conventional molded composite articles cannot always be used for applications where airtightness is required. This tendency is particularly apparent in the case of crystalline resins, such as polyacetal, polyester, polyamide, and polyphenylene sulfide resins. In general, such polycrystalline resins have a high rate of solidification and exhibit not only a rapid change in the modulus of elasticity around the solidification temperature, but also large mold shrinkage, which is frequently problematic. Amorphous resins more or less exhibit the above-described tendency as well, and thus cannot reliably be used in applications where high airtightness, adhesion and adhesive properties are required.

Known means for solving the problems mentioned above during the insert molding include using an insert member having a surface covered with synthetic rubber or the like. For example, Japanese Patent Laid-Open No. 42251/1978 discloses an insert molding method wherein use is made of an insert member having an organic polymer material coating provided on its surface, and more particularly discloses coating the insert material with an epoxy resin or nylon.

Although the known techniques in the art usually improve the airtightness of the insert molded article to a considerable extent, the airtightness, adhesion and adhesive properties are still sometimes inadequate when the molded article is used under severe conditions, for example, under high pressure conditions. Furthermore, the durability of the airtightness, adhesion and adhesive properties is also usually inadequate when the molded article is used in applications where it is exposed continuously repeatedly to high or low temperatures.

It should therefore be readily apparent that significant technical obstacles exist in the preparation of a functional insert molded article having excellent airtightness and durability. Therefore, improvements in insert molding methods have been needed.

The present invention is directed in improvements in insert molded articles whereby the articles exhibit airtightness, adhesion and adhesive properties at the interface between the insert member and the surrounding mass of injection molded resin. More specifically, the present invention relates to the discovery that providing a coating containing a specific component (to be discussed below) on the surface of an insert member is effective in achieving enhanced air-tight and adhesion properties between the insert member and the resin mass.

DETAILED DESCRIPTION OF THE PREFERRED EXEMPLARY EMBODIMENTS

The present invention is particularly characterized by using an insert member having a surface coating comprised of an organic polymer compound and, incorporated therein, at least one compound selected from the group consisting of spiro-ortho-ester compounds, spiro-orthocarbonate compounds, trioxacylooctane compounds, and ketal lactone compounds.

In the present invention, therefore, the coating comprised of the specific components noted above is first provided on the surface of the insert member and then the resin mass is injection molded around at least a portion of the thus coated insert member.

The organic polymer component (hereinafter sometime referred to as "component (A)") serves as a base material for forming an adhesive and elastic coating between the insert member and the molding resin. Examples of useable organic polymer components include various kinds of rubber, such as butadiene, isoprene, nitrile, chloroprene, and acrylic rubbers; various elastomers such as polyurethane, polyester, polyamide, and polyolefin elastomers; various thermoplastic resins such as thermoplastic polyurethane, polyamide, polyester, polycarbonate, polystyrene, polyacrylate, polyvinyl alcohol, polyvinyl acetate, and polyvinyl chloride; and thermosetting resins such as epoxy, phenolic, melamine, and unsaturated polyester resins. Preferable examples thereof include polyurethane resin, polyamide resin, elastomer, and synthetic rubber.

Coating an insert member with the organic polymer component alone does not improve the airtightness and the like of the insert molded article. By contrast, the present invention is especially characterized in that the coating further contains at least one component (hereinafter sometimes referred to as "component (B)") selected from the group consisting of spiro-ortho-ester compounds, spiro-orthocarbonate compounds, trioxacylooctane compounds, and ketal lactone compounds. It has therefore been found that, by using coating comprised of the above-described components, significant improvements in airtightness and adhesion properties of the insert molded article ensue.

Component (B) mainly serves to make the coating nonshrinkable. Component (B) is thought to form a crosslinked structure and expand when intramolecular irreversible ring opening is conducted in the presence of a cationic catalyst. Component (B) thus effectively improves the adhesion between the insert member and the molded resin of the insert molded article while, at the same time, relaxes external stress and reduces strain between the insert member and the molded resin of the insert molded article. Component (B) is particularly preferably a spiro-ortho-ester compound, and representative examples thereof include 2,2-bis-[4-(2,3-epoxypropoxy)phenyl]propane/6-hexanolide polyaddition product and 8,10,19,20-tetraoxatrispiro-[5.2.2.5.2.2] henecosane-2,14-diene. Particularly preferred among them is spiro-ortho-ester compound which has a degree of spiro ortho esterification of 250 to 500 g/eq, more preferably 300 to 400 g/eq and an epoxy value of 0 to 5.0 g/eq, particularly preferably 4.65 g/eq. A spiro orthocarbonate compound is another preferred substance, and specific examples thereof include compounds represented by the following formulae:

A cationic component in a reaction system brings about the ring opening of component (B). In general, it is preferred that the ring opening reaction be accelerated through the presence of a catalyst such as methylhexahydrophthalic anhydride and di-n-butyltin dilaurate. However, the ring opening occurs also through the influence of a filler having —COOH, —SO$_3$H, etc. or an acidic hydroxyl group (such as aluminum silicate, magnesium silicate or organic microgel having a carboxyl group on the surface thereof) which is present in the system. Since it is difficult to bring about the ring-opening reaction at room temperature, the ring opening reaction must be promoted by heating at least once between the step of applying a coating on the insert material and the use of the molded article. Since sufficient ring opening and expansion of component (B) is effected by means of the heat of the resin during molding, there is usually no need for further heating. However, if desired, the insert member may be heated after the application of its surface coating for the purpose of effecting the ring opening and expansion of component (B), followed by drying and fixing of the coating. Alternatively, post-heating may be conducted after molding.

There is no particular limitation with respect to when component (B) must be reacted to cause ring opening and expansion. Specifically, component (B) may be present in a ring-opened and expanded state in a coating applied on the surface of the insert member. Furthermore, the ring of component (B) may be in a partially or entirely opened state.

In the present invention, the coating applied on the surface of the insert material mainly comprises the above-described components (A) and (B). Although sufficiently improved airtightness and adhesive properties can be attained by the presence of components (A) and (B) only, further improved effects can be obtained by additionally incorporating at least one member selected from the group consisting of a cellulose derivative and a hydroxyl-containing surfactant. The cellulose derivative (hereinafter sometimes referred to as "component (C)") serves to impart improved film forming property (hot flowability) and hardness to the formed coating. Examples of component (C) particularly suitable for use in the present invention include cellulose esters such as cellulose acetate, cellulose propionate, cellulose butyrate, cellulose acetate propionate, cellulose acetate butyrate, and cellulose nitrate. Particularly preferred are cellulose acetate butyrate and cellulose acetate propionate having a high degree of butyration or propionylation, i.e., a degree of butyration or propionylation of 17 to 55%. The hydroxyl concentration and viscosity of the cellulose derivative are 1.0 to 3.0, more preferably about 1.0 (per four anhydrous glucose units) and 0.01 to 20.0 sec, more preferably about 0.02 sec (standard falling ball viscosity), respectively.

The hydroxyl-containing surfactant (hereinafter sometimes referred to as "component (D)") contributes to surface conditioning of the coating and to improved interlaminar adhesion between the insert member and the molded resin. A fluorocarbon or silicon surfactant having a hydroxyl group is particularly preferred. Specific examples of the fluorocarbon surfactant include a hydroxylated perfluroroalkyl surfactant, and specific examples of the silicon surfactant include a hydroxylated organosiloxane. In both the cases, surfactants having a high hydroxyl value are useful. Part of the hydroxyl groups are exposed to the surface in an unbound state and imparts excellent adherability to the molded resin.

It is preferred that the above-described film forming components be compounded so as to have the following percentage composition.

With respect to components (A) and (B) as indispensable components, it is preferred that they be compounded in a component (A) to component (B) ration of 99 to 50/1 to 50 (% by weight).

When the amount of compounding of component (B) is less than 1% by weight, inadequate expansion and plasticization can be attained and the surface smoothness of the coating is poor, so that the airtightness, adhesive property, etc. can only be improved slightly. On the other hand, when the amounts of components (B) and (A) are more than 50% by weight and less than 50% by weight, respectively, an adhesive layer which imparts high adhesion is absent thereby often rendering the adhesion between the insert member and the molded resin insufficient.

The amounts of compounding of components (A) and (B) are particularly preferably 97 to 65% by weight and 3 to 35% by weight, respectively.

The amount of compounding of component (C) is preferably 0 to 15% by weight from the viewpoint of the adhesion between the insert member and the molded resin. The amount is particularly preferably 0.5 to 10% by weight.

When component (D) is added in excess, defects (craters etc.) often occur in the coating. For this reason, component (D) is preferably compounded in an amount of 0 to 5% by weight 9 based on the whole coating agent composition). The amount of compounding is more preferably 0.05 to 3% by weight.

In the present invention, the coating applied on the surface of the insert member is comprised of the above-described composition. In order to enhance the coating performance, it is also possible to further add various additives, such as stabilizers and nucleating agents, as may be necessary for specific purposes.

In the present invention, a coating can be applied on the surface of the insert member by any method commonly used in the art. One example of the method comprises dissolving the film forming components in a solvent, adjusting the viscosity of the resultant solution, and applying the solution on the insert member by brush coating, spray coating, immersion coating, airless coating, roller coating, shower coating, or the like. This method is suitable for applying a coating containing a thermoplastic resin or rubber as component (A). Another example of the method comprises applying a coating solution containing a reactive low-molecular compound and polymerizing or crosslinking the resultant coating. This method is suitable for applying a coating containing a thermosetting resin or the like as component (A).

In the above-described method of applying a coating, it is preferred that, after a coating solution containing film forming components has been applied to the surface of the insert material, the resultant coating be heated for purposes of solvent removal, polymerization, crosslinking, or the like. For example, when the purpose of heating is to conduct drying, solvent removal or the like, the coating is heated preferably between 40° to 160° C. for 2 to 60 min, particularly preferably between 80° to 140° C. for 5 to 30 min.

It is possible to apply two or more coating layers of different compositions to the insert member, provided that at least one of the layers falls within the scope of the coating composition specified according to the present invention.

The coating is most effectively applied over the entire surface of the insert member. However, it is also possible to provide the coating on only a part of the surface of the insert member. The thickness of the coating is preferably 5 to 300 μm.

When the thickness is less than 5 μm, inadequate airtightness and adhesive properties can be attained. On the other hand, when the thickness exceeds 300 μm, the coating smoothness is less thereby resulting in less airtightness and, in some coating components, less anchoring between the insert member and the molded resin. The coating thickness is particularly preferably between 10 to 200 μm.

As described above, the present invention is characterized by providing a coating comprising specific components on the surface of an insert member and conducting insert molding. There is no particular limitation with respect to the material for the insert member. Thus, the insert member may be selected from metal, ceramic, wood, and plastic materials. Metal is generally used, and the effect of the present invention is more prominently exhibited when metal having a coefficient of thermal expansion and a thermal conductivity significantly different from those of the injection molded resin is used as the insert member.

The insert member having a coating applied thereon is then placed in a mold, and a thermoplastic resin is injection molded so as to form an insert molded article of predetermined shape. It is possible, in this regard, to use any known insert molding technique.

The reasons why the insert molded article prepared by making use of the above-described insert member having a coating applied thereon according to the present invention exhibits excellent and durable airtightness, adhesion and adhesive properties are believed to be as follows.

In the prior art method wherein no coating is provided on the insert member, the resin injected through a gate is brought into contact with the metal of the insert member, for example, and slides on the surface of the insert member or moves in a complicated manner with the surface solidification accompanying the progress of the packing. In this step, fine and complicated irregularities are formed on the surface of the resin in contact with the insert member. Although the irregularities disappear to some extent when the resin is pressed against the insert material due to solidification and shrinkage of the resin after the completion of the packing, they do not completely disappear but instead remain in the form of a void at the boundary, which brings about poor airtightness.

The remaining surface irregularities are significant in the case of crystalline resins which rapidly solidify, exhibit large shrinkages, and exhibit a rapid viscosity or elasticity change at or near solidification temperature. Resins containing reinforcement material are also susceptible to irregularity formation.

By contrast, since the insert member of the present invention has a coating containing an organic polymer compound having a low thermal conductivity present on its surface, the resin is prevented from solidifying on the surface of the insert member. Therefore, even if irregularities are formed, the unsolidified or partially solidified resin is press-packed into part of the irregularities thereby decreasing the same and contributing to improved airtightness. Furthermore, in the present invention, the coating contains component (B), and thus the expansion accompanying ring opening thereof causes the resin to be more effectively packed in any irregularities that may be formed during molding, so that the airtightness and adhesion properties are markedly improved.

It may further be presumed that the presence of a coating containing component (B) at the boundary between the insert member and the resin suppresses peeling and void formation due to differences in thermal expansion, shrinkage, and the like between the insert member and the resin, which thereby maintaining the excellent airtightness and adhesion properties that have been obtained.

The insert molded article prepared by the present invention is believed to exhibit excellent effects by means of the above-described mechanisms. Thus, the present invention is particularly effective using a resin having a high rate of solidification and a rapid viscosity increase or modulus of elasticity increase at or near the solidification temperature, such as, crystalline resins including polyesters (e.g., polyethylene terephthalate and polybutylene terephthalate), polyacetal, polyamide, polyphenylene sulfide, and polypropylene.

Significant effects can also be attained with respect to resins packed with reinforcements, such as glass fibers, glass flakes, carbon fibers, or metallic fibers. On the other hand, non-reinforced amorphous resins inherently exhibit relatively excellent airtightness. Therefore, the effect of the present invention is relatively small. However, the method of the present invention is useful for attaining even higher degrees of airtightness for such resins.

The method of insert molding according to the present invention can be employed in combination with other methods useful for improving airtightness. For example, knurly or annular irregularities on the surface of the insert member are commonly employed in the art for the purpose of increasing the anchor effect between the insert member and the molded resin. The combined use of this known method with the present invention brings about an increase in the contact area between the insert material and the resin, which thereby not only contributes to improved adhesion, but also brings about an increase in the overall length of the potential fluid leakage path so that further airtightness improvements can be attained. The use of an 0-ring may also be useful in this regard.

As is apparent from the foregoing description, an insert molded article prepared according to the present invention (i.e., by using an insert material having an applied surface coating comprising specific components and then insert molding a thermoplastic resin thereto) exhibits excellent and durable airtightness, adhesive, and adhesion properties even under extreme conditions of use, such as exposure to high temperatures and/or high pressure.

EXAMPLES

The present invention will be described in more detail with reference to the following Examples which should not be construed as limiting the scope of the present invention. In this regard, the following evaluation procedures were employed:

(1) Airtightness after thermal shock treatment:

Cooling at $-40°$ C. for 30 min and heating at 120° C. for 30 min of an insert molded article were repeated 500 times with a;thermal shock tester and the treated article was fixed to a jig. The fixed
insert molded article was gradually pressurized to 3.0 kg/cm$^2$ in water with an air compressor to measure a pressure at which air bubbles begin to leak from the insert portion (evaluation A). Further, the state of occurrence of air bubbles under a pressure of 3.0 kg/cm$^2$ was evaluated in the five following ranks (evaluation B).

good airtightness (free from occurrence of air bubbles) — poor airtightness (vigorous occurrence of air bubbles)

(2) Airtightness after high-temperature treatment'

An insert molded article after being heated at 120° C. for 48 hr was subjected to evaluation in the same manner as that described above.

(3) Airtightness after low-temperature treatment:

An insert molded article after being cooled at $-40°$ C. for 48 hr was subjected to evaluation in the same manner as that described above.

(4) Airtightness without heating and cooling treatments:

The measurement of the airtightness was conducted according to the above-described evaluation A with respect to an insert molded article which had been subjected to neither heat treatment nor cooling treatment described in the above items (1) to (3). In this test, a pressure up to 5.0 kg/cm$^2$ was applied.

Examples 1 to 8 and Comparative Examples 1 and 2

Figure 1A:
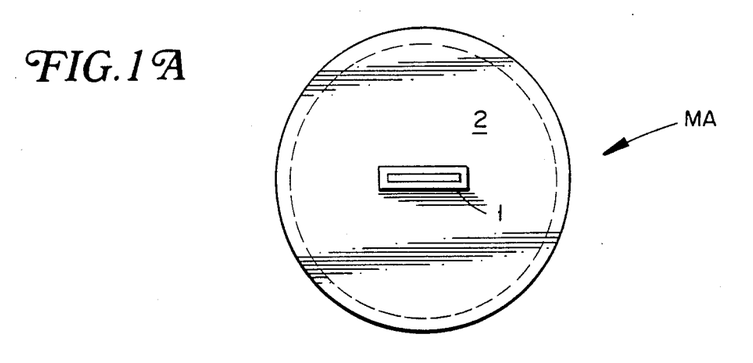
FIG. 1A is a schematic plan view of an insert molded composite article which was prepared in accordance with the Examples and Comparative Examples that follow so as to provide a means to evaluate its airtightness.
Figure 1B:
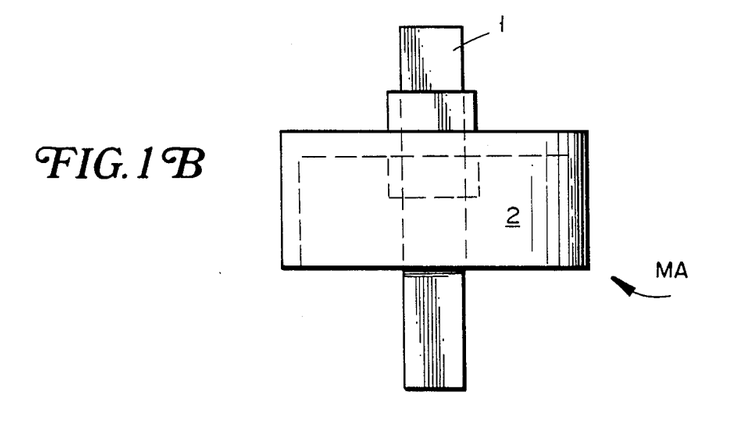
FIG. 1B is a schematic elevation view of the article depicted in FIg. 1A.

A polyacetal resin (Duracon M90; a product of Polyplastics Co., Ltd.) was insert molded by making use of a brass insert member having, applied thereto, a coating comprising a composition shown in Table 1. The insert molded article MA formed according to these Examples is shown in FIGS. 1A and 1B as having the insert member 1 embedded within a mass of injection molded thermoplastic resin 2, which in these Examples is polyacetal.

The insert molded article thus prepared was subjected to airtightness evaluation with the results being shown in Table 1.

For comparison, the same evaluation was conducted also with respect to an insert molded article prepared by making use of an insert member having no coating applied thereto and an insert molded article prepared by making use of an insert member having an applied coating comprising a composition outside the scope of the present invention. The results are shown in Table 1.

TABLE 1

|  |  |  | Ex. 1 | Ex. 2 | Ex. 3 | Ex. 4 | Ex. 5 |
|---|---|---|---|---|---|---|---|
| Coating composition (wt %) | (A) | polyurethane resin*[1] | 90.0 | 80.0 | 80.0 | 77.0 | 79.7 |
|  | (B) | spiro ortho ester compound*[2] | 10.0 | 20.0 | 20.0 | 20.0 | 20.0 |
|  | (C) | cellulose acetate butyrate | — | — | — | 2.0 | — |
|  | (D) | hydroxyl-containing fluorocarbon surfactant*[3] | — | — | — | — | 0.3 |
| Coating thickness ($\mu$m) |  |  | 80~100 | 20~30 | 80~100 | 80~100 | 80~100 |
| Results of evaluation on airtightness | after thermal shock treatment | evaluation A (kg/cm$^2$) | 2.0 | 2.1 | 2.3 | 2.8 | 2.5 |
|  |  | evaluation B | 3 | 3 | 3~4 | 4~5 | 4 |
|  | after high-temperature treatment | evaluation A (kg/cm$^2$) | 2.2 | 2.2 | 2.8 | 3.0< | 3.0< |
|  |  | evaluation B | 3~4 | 3~4 | 4~5 | 5 | 5 |
|  | after low-temperature treatment | evaluation A (kg/cm$^2$) | 2.4 | 2.3 | 3.0< | 3.0< | 3.0< |
|  |  | evaluation B | 3~4 | 3~4 | 5 | 5 | 5 |
|  | without heat and cooling treatments | evaluation A (kg/cm$^2$) | 3.5 | 3.4 | 3.8 | 4.6 | 4.2 |

|  |  |  | Ex. 6 | Ex. 7 | Ex. 8 | Comp. Ex. 1 | Comp. Ex. 2 |
|---|---|---|---|---|---|---|---|
| Coating composition | (A) | polyurethane resin*[1] | 76.7 | 86.7 | 73.7 | — | 100 |
|  | (B) | spiro ortho ester compound*[2] | 20.0 | 10.0 | 20.0 | — | — |

TABLE 1-continued

| (wt %) | (C) | cellulose acetate butyrate | | 3.0 | 3.0 | 6.0 | — | — |
|---|---|---|---|---|---|---|---|---|
| | (D) | hydroxyl-containing fluorocarbon surfactant[*3] | | 0.3 | 0.3 | 0.3 | — | — |
| Coating thickness (μm) | | | | 80~100 | 80~100 | 80~100 | — | 80~100 |
| Results of evaluation on airtightness | after thermal shock treatment | | evaluation A (kg/cm$^2$) | 3.0 | 2.7 | 3.0 | 0.5 | 0.9 |
| | | | evaluation B | 5 | 4 | 5 | 1 | 1~2 |
| | after high-temperature treatment | | evaluation A (kg/cm$^2$) | 3.0< | 3.0< | 3.0< | 0.5 | 1.1 |
| | | | evaluation B | 5 | 5 | 5 | 1 | 2 |
| | after low-temperature treatment | | evaluation A (kg/cm$^2$) | 3.0< | 3.0< | 3.0< | 0.6 | 1.2 |
| | | | evaluation B | 5 | 5 | 5 | 1 | 2 |
| | without heat and cooling treatments | | evaluation A (kg/cm$^2$) | 5.0< | 5.0< | 5.0< | 1.2 | 2.3 |

[*1]Burnock; a product of Dainippon Ink & Chemicals, Inc.
[*2]2,2-bis[4-(2,3-epoxypropoxy)phenyl]propane/6-hexanolide polyaddition product (catalyst: di-n-butyltin dilaurate)
[*3]Defensa MCF-312; a product of Dainippon Ink & Chemicals, Inc.

Examples 9 to 14 and Comparative Examples 3 to 6

Insert molding and evaluation of the molded article were conducted in the same manner as that of Examples 1 to 8, except that a polyacetal resin (POM) containing 20% by weight of glass fibers or 20% by weight of carbon fibers incorporated therein was used as the molding resin and the coating composition to be applied to the insert material was varied as shown in Table 2.

For comparison, the same evaluation was conducted also with respect to an insert molded article prepared by making use of an insert material having no coating applied thereto and an insert molded article prepared by making use of an insert material having, applied thereto, a coating comprising a composition outside the scope of the present invention. The results are shown in Table 2.

TABLE 2

| | | | | Ex. 9 | Ex. 10 | Ex. 11 | Ex. 12 | Ex. 13 | Ex. 14 |
|---|---|---|---|---|---|---|---|---|---|
| Molding resin composition (wt %) | | POM | | 80 | 80 | 80 | 80 | 80 | 80 |
| | | glass fiber | | 20 | 20 | 20 | 20 | — | — |
| | | carbon fiber | | — | — | — | — | 20 | 20 |
| Coating composition (wt %) | (A) | polyurethane resin[*1] | | 80.0 | 77.0 | 79.7 | 76.7 | 80.0 | 76.7 |
| | (B) | spiro ortho ester compound[*2] | | 20.0 | 20.0 | 20.0 | 20.0 | 20.0 | 20.0 |
| | (C) | cellulose acetate butyrate | | — | 3.0 | — | 3.0 | — | 3.0 |
| | (D) | hydroxyl-containing fluorocarbon surfactant[*3] | | — | — | 0.3 | 0.3 | — | 0.3 |
| Coating thickness (μm) | | | | 80~100 | 80~100 | 80~100 | 80~100 | 80~100 | 80~100 |
| Results of evaluation on airtightness | after thermal shock treatment | | evaluation A (kg/cm$^2$) | 2.4 | 3.0< | 2.8 | 3.0< | 2.6 | 3.0< |
| | | | evaluation B | 4 | 5 | 4~5 | 5 | 4 | 5 |
| | after high-temperature treatment | | evaluation A (kg/cm$^2$) | 3.0< | 3.0< | 3.0< | 3.0< | 3.0< | 3.0< |
| | | | evaluation B | 5 | 5 | 5 | 5 | 5 | 5 |
| | after low-temperature treatment | | evaluation A (kg/cm$^2$) | 3.0< | 3.0< | 3.0< | 3.0< | 3.0< | 3.0< |
| | | | evaluation B | 5 | 5 | 5 | 5 | 5 | 5 |
| | without heat and cooling treatments | | evaluation A (kg/cm$^2$) | 4.2 | 5.0< | 4.7 | 5.0< | 4.3 | 5.0 |

| | | | | Comp. Ex. 3 | Comp. Ex. 4 | Comp. Ex. 5 | Comp. Ex. 6 |
|---|---|---|---|---|---|---|---|
| Molding resin composition (wt %) | | POM | | 80 | 80 | 80 | 80 |
| | | glass fiber | | 20 | 20 | — | — |
| | | carbon fiber | | — | — | 20 | 20 |
| Coating composition (wt %) | (A) | polyurethane resin[*1] | | — | 100 | — | 100 |
| | (B) | spiro ortho ester compound[*2] | | — | — | — | — |
| | (C) | cellulose acetate butyrate | | — | — | — | — |
| | (D) | hydroxyl-containing fluorocarbon surfactant[*3] | | — | — | — | — |
| Coating thickness (μm) | | | | — | 80~100 | — | 80~100 |
| Results of evaluation on airtightness | after thermal shock treatment | | evaluation A (kg/cm$^2$) | 0.6 | 1.2 | 0.6 | 1.2 |
| | | | evaluation B | 1 | 2 | 1 | 2 |
| | after high-temperature treatment | | evaluation A (kg/cm$^2$) | 0.6 | 1.3 | 0.7 | 1.4 |
| | | | evaluation B | 1 | 2 | 1 | 2 |
| | after low-temperature treatment | | evaluation A (kg/cm$^2$) | 0.6 | 1.4 | 0.7 | 1.5 |
| | | | evaluation B | 1 | 2 | 1 | 2 |
| | without heat and cooling treatments | | evaluation A (kg/cm$^2$) | 1.3 | 2.4 | 1.3 | 2.6 |

[*1] to [*3] respectively corresponding to those shown in Table 1

Examples 15 to 21 and Comparative Examples 7 to 8

Insert molding and evaluation of the molded article were conducted in the same manner as that of Examples 1 to 8 by making use of the above-described polyacetal resin as the molding resin, except that the components and composition of the coating to be applied to the insert material were varied as shown in Table 3 (coating thickness: 80 to 100 μm).

For comparison, the same evaluation was conducted also with respect to an insert molded article prepared by making use of an insert material having no coating applied thereto and an insert molded article prepared by making use of an insert material having, applied thereto, a coating comprising a composition outside the scope of the present invention. The results are shown in Table 3.

Polybutylene terephthalate (PBT) and polyphenylene sulfide (PPS) containing glass fibers incorporated therein were used as the molding resin. A coating having a composition shown in Table 4 was applied to an insert material (coating thickness' 80 to 100 μm). Insert molding was conducted to prepare an insert molded material, and the insert molded material thus prepared was evaluated.

For comparison, the same evaluation was conducted also with respect to an insert molded article prepared by making use of an insert material having no coating applied thereto and an insert molded article prepared by making use of an insert material having, applied thereto, a coating comprising a composition outside the scope of the present invention. The results are shown in Table 4.

TABLE 3

|  |  |  | Ex. 15 | Ex. 16 | Ex. 17 | Ex. 18 | Ex. 19 | Ex. 20 | Ex. 21 | Comp. Ex. (1) | Comp. Ex. 7 | Comp. Ex. 8 | Comp. Ex. (2) |
|---|---|---|---|---|---|---|---|---|---|---|---|---|---|
| Coating composition (wt %) | (A) | polyurethane resin*1 | — | — | — | — | 76.7 | 76.7 | 76.7 | — | — | — | 100 |
|  |  | polyester elastomer*4 | 80 | 76.7 | — | — | — | — | — | — | 100 | — | — |
|  |  | chloroprene rubber*5 | — | — | 80 | 76.7 | — | — | — | — | — | 100 | — |
|  | (B) | spiro ortho ester compound*2 | 20 | 20 | 20 | 20 | — | 20 | 20 | — | — | — | — |
|  |  | spiro orthocarbonate compound*6 | — | — | — | — | 20 | — | — | — | — | — | — |
|  | (C) | cellulose acetate butyrate | — | 3.0 | — | 3.0 | 3.0 | — | 3.0 | — | — | — | — |
|  |  | cellulose acetate propionate | — | — | — | — | — | 3.0 | — | — | — | — | — |
|  | (D) | hydroxyl-containing fluorocarbon surfactant*3 | — | 0.3 | — | 0.3 | 0.3 | 0.3 | — | — | — | — | — |
|  |  | hydroxyl-containing surfactant*7 | — | — | — | — | — | — | 0.3 | — | — | — | — |
| Results of evaluation on airtightness | after thermal shock treatment | evaluation A (kg/cm²) | 2.2 | 3.0< | 2.3 | 3.0< | 2.9 | 3.0< | 3.0< | 0.5 | 0.8 | 0.9 | 0.9 |
|  |  | evaluation B | 3~4 | 5 | 3~4 | 5 | 3~4 | 5 | 5 | 1 | 1~2 | 1~2 | 1~2 |
|  | after high-temperature treatment | evaluation A (kg/cm²) | 2.6 | 3.0< | 2.6 | 3.0< | 3.0< | 3.0< | 3.0< | 0.5 | 0.9 | 1.0 | 1.1 |
|  |  | evaluation B | 4 | 5 | 4 | 5 | 5 | 5 | 5 | 1 | 1~2 | 1~2 | 2 |
|  | after low-temperature treatment | evaluation A (kg/cm²) | 3.0< | 3.0< | 3.0< | 3.0< | 3.0< | 3.0< | 3.0< | 0.6 | 1.1 | 1.2 | 1.2 |
|  |  | evaluation B | 5 | 5 | 5 | 5 | 5 | 5 | 5 | 1 | 2 | 2 | 2 |
|  | without heat and cooling treatments | evaluation A (kg/cm²) | 3.7 | 5.0< | 4.0 | 5.0< | 5.0< | 5.0< | 5.0< | 1.1 | 2.0 | 2.3 | 2.4 |

*1 to *3 respectively corresponding to those shown in Table 1.
*4 Hytrel; a product of Toray Industries, Inc. and E. I. du Pont de Nemours & Co.
*5 Neoprene; a product of Showa Denko K.K. and E. I. du Pont de Nemours & Co.
*6 a compound having the following structural formula:

*7 BYK No-370; a product of Big Chemi Inc.

TABLE 4

|  |  |  | Ex. 22 | Ex. 23 | Ex. 24 | Ex. 25 | Comp. Ex. 9 | Comp. Ex. 10 | Comp. Ex. 11 | Comp. Ex. 12 |
|---|---|---|---|---|---|---|---|---|---|---|
| Molding resin composition (wt %) |  | PBT | 70 | 70 | — | — | 70 | 70 | — | — |
|  |  | PPS | — | — | 60 | 60 | — | — | 60 | 60 |
|  |  | glass fiber | 30 | 30 | 40 | 40 | 30 | 30 | 40 | 40 |
| Coating composition (wt %) | (A) | polyurethane resin*1 | 80 | 76.7 | 80 | 76.7 | — | 100 | — | 100 |
|  | (B) | spiro ortho ester compound*2 | 20 | 20 | 20 | 20 | — | — | — | — |
|  | (C) | cellulose acetate butyrate | — | 3 | — | 3 | — | — | — | — |
|  | (D) | hydroxyl-containing fluorocarbon surfactant*3 | — | 0.3 | — | 0.3 | — | — | — | — |
| Results of evaluation on airtightness | after thermal shock treatment | evaluation A (kg/cm²) | 2.8 | 3.0< | 3.0< | 3.0< | 0.8 | 1.2 | 0.9 | 1.3 |
|  |  | evaluation B | 4~5 | 5 | 5 | 5 | 1 | 2 | 1 | 2 |
|  | after high-temperature treatment | evaluation A (kg/cm²) | 3.0< | 3.0< | 3.0< | 3.0< | 0.8 | 1.4 | 1.0 | 1.4 |
|  |  | evaluation B | 5 | 5 | 5 | 5 | 1 | 2 | 1~2 | 2 |
|  | after low-temperature treatment | evaluation A (kg/cm²) | 3.0< | 3.0< | 3.0< | 3.0< | 1.0 | 1.4 | 1.2 | 1.6 |
|  |  | evaluation B | 5 | 5 | 5 | 5 | 1~2 | 2 | 2 | 2 |
|  | without heat and cooling treatments | evaluation A (kg/cm²) | 4.8 | 5.0< | 5.0< | 5.0< | 1.9 | 2.5 | 2.2 | 2.8 |

*1 to *3 respectively corresponding to those shown in Table 1.

Examples 22 to 25 and Comparative Examples 9 to 12

What is claimed is:

1. A method of making a composite injection molded article which includes at least a portion of an insert member imbedded within, and adhered to, a mass of thermoplastic resin, said method comprising the steps of:
   (a) positioning within a mold at least a portion of an insert member having a layer coating thereon which comprises (i) an organic polymer, and (ii) at least one ring-openable compound selected from the group consisting of spiro-ortho-ester and spiro-ortho-carbonate compounds; and
   (b) injecting a mass of thermoplastic resin into said mold such that, upon cooling, said portion of said insert member is imbedded within and adhered to said mass of thermoplastic resin.

2. A method as in claim 1, wherein said layer coating further comprises at least one additional component selected from the group consisting of cellulose derivatives and hydroxyl-containing surfactants.

3. A method as in claim 2, wherein said derivatives are selected from the group consisting of cellulose acetate, cellulose propionate, cellulose butyrate, cellulose acetate propionate, cellulose acetate butyrate, and cellulose nitrate.

4. A method as in claim 2, wherein said hydroxyl-containing surfactants are selected from the group consisting of hydroxylated perfluoroalkyls, and hydroxylated organosiloxanes.

5. A method as in claim 1 or 2, wherein said organic polymer is at least one organic polymer selected from the group consisting of polyurethane resins, polyester resins, polyamide resins, elastomers, and synthetic rubbers.

6. A method as in claim 1 or 2, wherein said thermoplastic resin is a crystalline thermoplastic resin.

7. A method as in claim 1, which further comprises the step of (c) subjecting the coating layer to elevated temperature sufficient to cause said ring-openable compound to undergo a ring-opening reaction.

8. A method as in claim 7, wherein step (c) is practiced before step (a) and includes heating said insert member so as to cause said ring-openable compound to undergo a ring-opening reaction.

9. A method as in claim 7, wherein step (c) is practiced after step (b), and includes heating said composite article so as to cause said ring-openable compound in said layer coating to undergo a ring-opening reaction.

10. A method as in claim 1, wherein said spiro-ortho-ester compound has a degree of esterification of between 250 and 500 g/eq, and an epoxy value of between 0 and 5.0 g/eq.

11. A method as in claim 10, wherein said spiro-ortho-ester is at least one selected from the polyaddition product of [4-(2,3-epoxypropoxy)phenyl]propane/6-hexanolide, and 8,10,19,20-tetraoxatrispiro-[5,2,2,2,2]heneicosane-2,14-diene.

12. A method as in claim 1 wherein said spiro-ortho-carbonate is at least one compound selected from the group consisting of compounds represented by the following formulas:

13. A method of making a composite article which includes a metallic insert member having at least a portion thereof imbedded within and adhered to a surrounding mass of thermoplastic resin, said method comprising the steps of:
   (a) forming a coating layer of between 10 to 200μm on a portion of a metallic insert member of predetermined shape and configuration with a composition which consists essentially of (i) between 65 to 97 wt.% of an organic polymer component, and (ii) between 3 to 35 wt.% of a ring-openable component selected from the group consisting of spiro-ortho-esters and spiro-ortho-carbonates;
   (b) positioning said coated metallic insert member within a mold;
   (c) injecting a mass thermoplastic resin into said mold so that said injected mass surrounds said metallic insert portion; and
   (d) heating said coating layer so as to cause said ring-openable compound to undergo a ring-opening reaction.

14. A method as in claim 13, wherein said layer coating further comprises at least one additional component selected from the group consisting of cellulose derivatives and hydroxyl-containing surfactants.

15. A method as in claim 14, wherein said derivatives are selected from the group consisting of cellulose acetate, cellulose propionate, cellulose butyrate, cellulose acetate propionate, cellulose acetate butyrate, and cellulose nitrate.

16. A method as in claim 14, wherein said hydroxyl-containing surfactants are selected from the group consisting of hydroxylated perfluroalkyls, and hydroxylated organosiloxanes.

17. A method as in claim 13 or 14, wherein said organic polymer is at least one organic polymer selected from the group consisting of polyurethane resins, polyester resins, polyamide resins, elastomers, and synthetic rubbers.

18. A method as in claim 13 or 14, wherein said thermoplastic resin is a crystalline thermoplastic resin.

* * * * *

UNITED STATES PATENT AND TRADEMARK OFFICE
CERTIFICATE OF CORRECTION

PATENT NO. : 4,980,109

DATED : December 25, 1990

INVENTOR(S) : Yamamoto et al

It is certified that error appears in the above-identified patent and that said Letters Patent is hereby corrected as shown below:

ABSTRACT, line 4, after "one" delete "compounds" and insert --compound--;
        line 5, after "ester" delete "compound" and insert --compounds--.

Column 1, line 22, after "molded" delete "article" and insert --articles--;
        line 60, after "uously" insert --and/or--.

Column 2, line 18, after "in" change "FIg." to --FIG.--;
        line 60, after "using" insert --a--.

Column 3, line 11, after "is" insert --a--.

Column 4, line 48, after "(B)" change "ration" to --ratio--.

Column 6, line 53, after "thereby" change "maintaining" to --maintain--.

Signed and Sealed this

Twenty-seventh Day of October, 1992

Attest:

DOUGLAS B. COMER

*Attesting Officer*        *Acting Commissioner of Patents and Trademarks*

UNITED STATES PATENT AND TRADEMARK OFFICE
CERTIFICATE OF CORRECTION

PATENT NO.   : 4,980,109
DATED        : December 25, 1990
INVENTOR(S)  : Seiji YAMAMOTO et al It is certified that error appears in the above-identified patent and that said Letters Patent is hereby corrected as shown below:

Column 14, line 10, insert the following formula:

Signed and Sealed this

Seventeenth Day of August, 1993

Attest:

BRUCE LEHMAN

Attesting Officer

Commissioner of Patents and Trademarks